US006987342B2

(12) United States Patent  
Hans

(10) Patent No.: US 6,987,342 B2  
(45) Date of Patent: Jan. 17, 2006

(54) ROTOR FOR AN ELECTRIC MOTOR

(75) Inventor: Helmut Hans, Georgen (DE)

(73) Assignee: Minebea Co., Ltd., Nagano-Ken (JP)

( * ) Notice: Subject to any disclaimer, the term of this patent is extended or adjusted under 35 U.S.C. 154(b) by 0 days.

(21) Appl. No.: 10/808,283

(22) Filed: Mar. 25, 2004

(65) Prior Publication Data

US 2004/0212266 A1 Oct. 28, 2004

(30) Foreign Application Priority Data

Apr. 24, 2003 (DE) .............................. 103 18 624

(51) Int. Cl.  
*H02K 21/12* (2006.01)

(52) U.S. Cl. ................................. 310/156.56

(58) Field of Classification Search ........... 310/156.53, 310/156.56, 156.57, 156.74, 156.76, 156.84, 310/216

See application file for complete search history.

(56) References Cited

U.S. PATENT DOCUMENTS

| | | | |
|---|---|---|---|
| 4,127,786 A | | 11/1978 | Volkrodt |
| 4,327,302 A | | 4/1982 | Hershberger |
| 4,339,874 A | | 7/1982 | McCarty et al. |
| 6,031,311 A | * | 2/2000 | Lee ........................ 310/156.57 |
| 6,147,428 A | * | 11/2000 | Takezawa et al. ..... 310/156.57 |
| 6,177,745 B1 | * | 1/2001 | Narita et al. ........... 310/156.53 |
| 2002/0067096 A1 | | 6/2002 | Yamamoto et al. |

FOREIGN PATENT DOCUMENTS

| | | |
|---|---|---|
| DE | 222745 | 5/1985 |
| DE | 10100718 | 7/2002 |
| EP | 0641059 | 3/1995 |
| EP | 0691727 | 1/1997 |
| EP | 0803962 | 10/1997 |
| EP | 0872944 | 10/1998 |
| EP | 0955714 | 11/1999 |
| EP | 1223658 | 7/2002 |
| EP | 1309066 | 5/2003 |
| GB | 1177247 | 1/1970 |
| JP | 09009537 | 1/1997 |
| JP | 2003116235 | 4/2003 |
| JP | 2003264947 | 9/2003 |
| WO | WO 00/57537 | 8/2000 |

OTHER PUBLICATIONS

"Design of Brushless Permanent-Magnet Motors," J.R. Hendershot Jr. and TJE Miller, Magna Physics Publishing and Clarendon Press, Oxford, 1994.

\* cited by examiner

*Primary Examiner*—Tran Nguyen  
(74) *Attorney, Agent, or Firm*—Duane Morris LLP

(57) ABSTRACT

The invention relates to a rotor for an electric motor comprising an essentially cylindrical rotor core having a central aperture and comprising permanent magnets which are embedded in the rotor core and extend essentially like spokes through the rotor core, the rotor core being formed as an integral body and the selected permanent magnets being bridged at their radially inner or outer ends by recesses in the rotor core.

9 Claims, 8 Drawing Sheets

Figure 1:
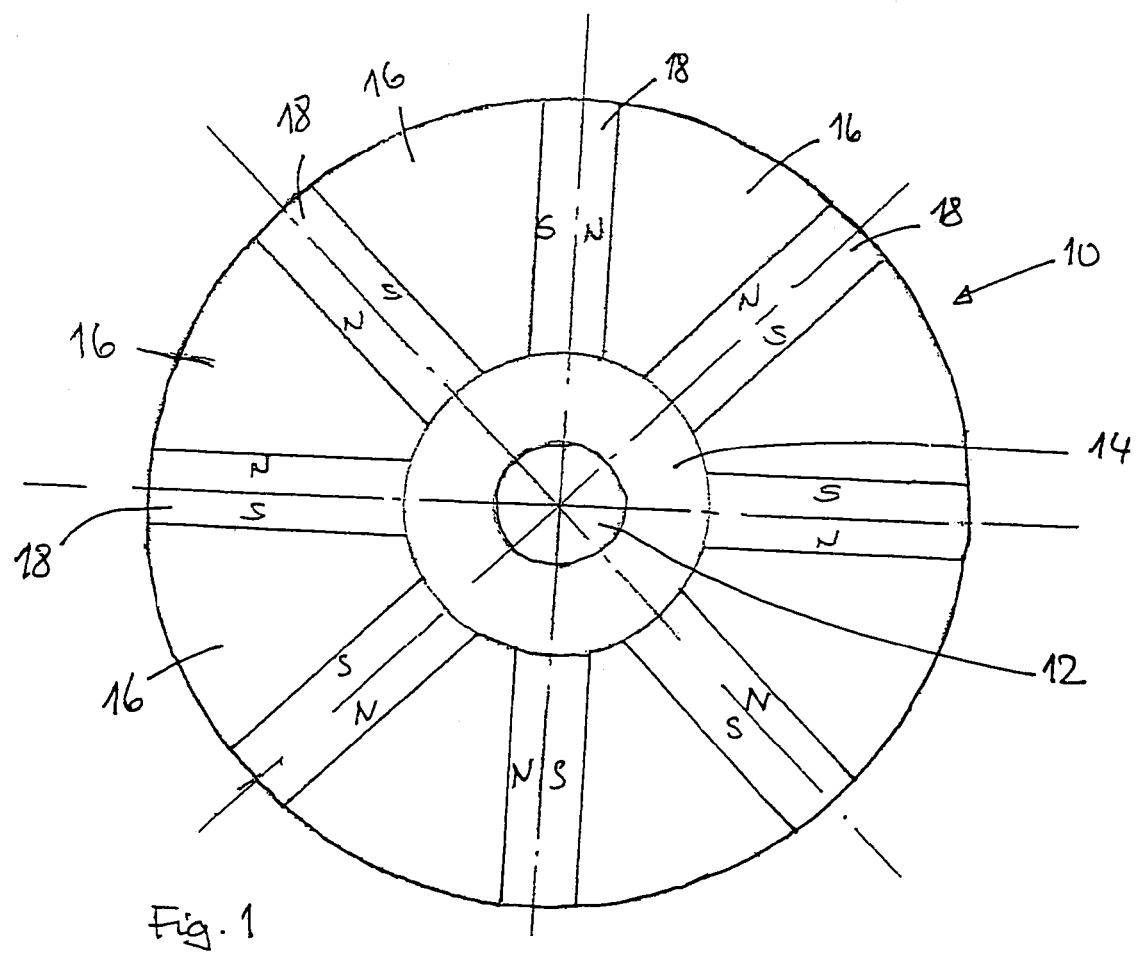

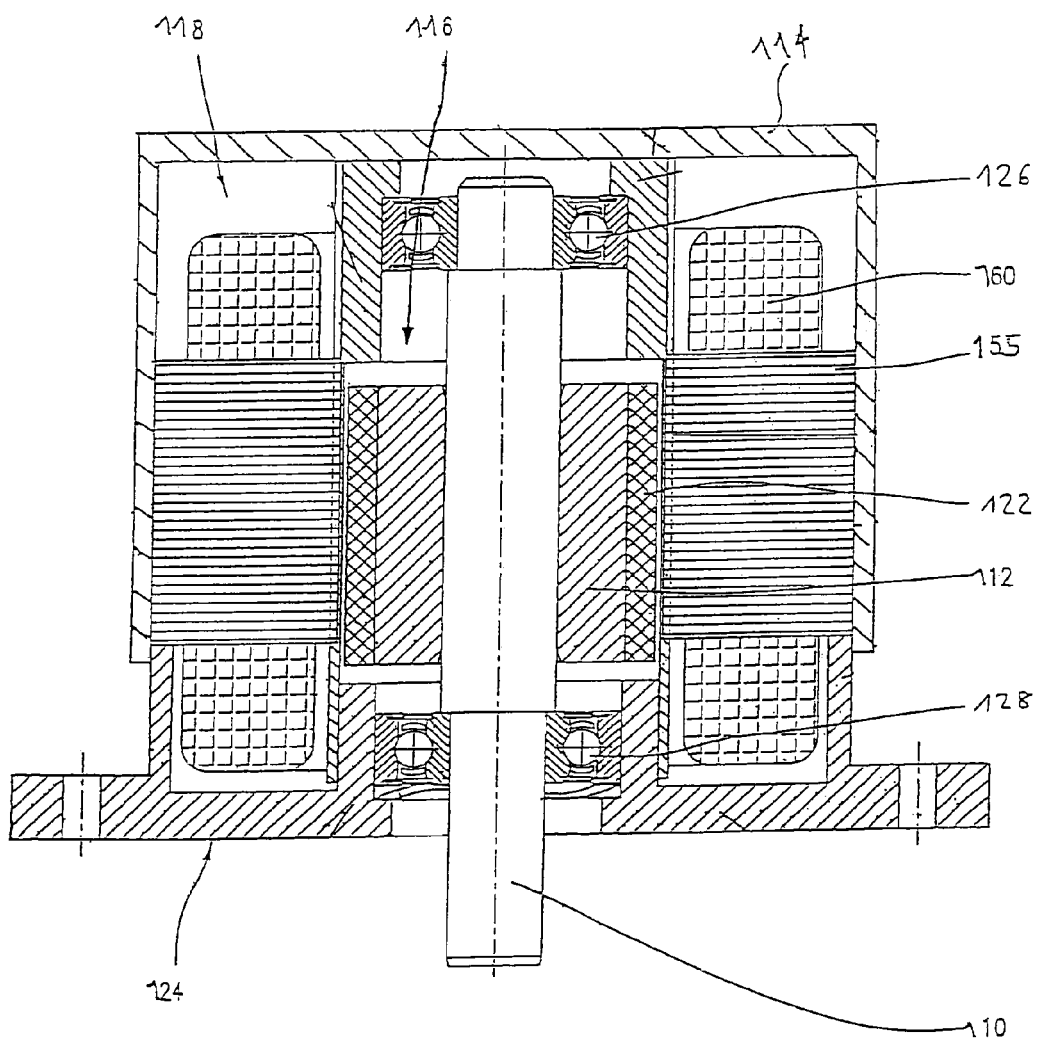
PRIOR ART FIG. 8

ROTOR FOR AN ELECTRIC MOTOR

This application claims priority to the filing date of German Patent Application No. 103 18 624.7 filed Apr. 24, 2003, the specification of which is incorporated herein in its entirety.

FIELD OF THE INVENTION

The invention relates to a rotor for an electric motor comprising an essentially cylindrical rotor core having a central aperture, and comprising permanent magnets which extend essentially like spokes through the rotor core, the permanent magnets being embedded in the rotor core.

BACKGROUND OF THE INVENTION

More generally, the invention relates to the field of electric motors having permanent magnets such as brushless, electronically commutated DC motors and other permanent magnet motors, and in particular those configured as inner rotor motors. In general, inner rotor motors consist of a rotor arrangement which is mounted onto the motor shaft and includes one or more permanent magnets, as well as a stator arrangement, such as a stator core, which is built up of metal laminations that carry windings. The rotor arrangement is coaxially inserted into the stator arrangement. For outer rotor motors, the rotor arrangement encloses the stator.

FIG. 8 shows the basic construction of an electric motor having a housing 114 in which a stator arrangement 118, a rotor arrangement 116 and bearings 126, 128 are accommodated to rotatably support the rotor arrangement. The stator arrangement 118 includes stacked metal laminations 155 and windings 160 and encloses an inner space into which the rotor arrangement 116 can be inserted. The rotor arrangement 116 includes the shaft 110, a back iron yoke 112 and permanent magnets 122. The bearings 126, 128 supporting the rotor arrangement can be integrated into a flange 124 in the motor housing 114.

FIG. 8 serves to explain the basic construction of an electric motor. As explained in the opening paragraph, the invention relates to a rotor for such an electric motor, the rotor having an essentially cylindrical rotor core with a central aperture and the permanent magnets being embedded in the rotor core.

According to the prior art, rotors with embedded magnets are generally known. A rotor configuration having a multi-polar design resembling a spoked wheel with radially extending embedded magnets is revealed, for example, in "Design of Brushless Permanent-Magnet Motors", J. R. Hendershot Jr. and T J E Miller, Magna Physics Publishing and Clarendon Press, Oxford, 1994. As shown in this publication, it is known to manufacture a rotor with embedded radially extending magnets that are protected by means of a ring or a tube surrounding the rotor. The rotor in which the magnets are embedded is used as a back yoke.

A conventional form of rotors with embedded magnets is also revealed in EP 0 691 727 A1. This publication shows a number of permanent magnets which are inserted into slots formed in the rotor allowing the permanent magnets to be inserted into the rotor from the outside. At their radially inner ends, the permanent magnets are enclosed by the material of the rotor core.

Rotors with embedded permanent magnets have the basic advantage that the magnets can be fully encapsulated so that the rotor can also come into contact with aggressive media without the magnet material needing special surface protection to prevent corrosion etc. However, the described rotor design has the disadvantage that stray flux is generated by the rotor core in the vicinity of the shaft.

To prevent such stray flux from arising, it has been suggested in the prior art to place a sleeve made of magnetically non-conductive or low-conductive material onto the shaft onto which the flux guide elements of the rotor core are then fixed, between which the permanent magnets in turn are embedded. Such a design is revealed, for example, in EP 0 641 059 A1; EP 0 803 962 A1; and DE 101 00 718 A1. Although this construction represents a great improvement on the prior art as described above in terms of the magnetic circuit and the distribution of magnetic flux density in the rotor, it is costly to manufacture and, due to the many individual parts, problems in the mechanical construction, such as an addition of tolerances, could arise.

EP 0803 962 A1 additionally shows that the slots to accommodate the permanent magnets have a bridge on their outer periphery to fully protect the permanent magnets from the outside.

WO 00/57537 describes a multi-polar permanent magnet rotor for an electric motor having embedded magnets which are disposed in such a way that a concentration of flux is produced. The permanent magnets are formed as flat cubes which are disposed like spokes radially to the rotor axis in recesses that are arranged between the flux guide elements which are fixed to the rotor. In assembling the magnets and the flux guide elements, the permanent magnets are formed as adjacent half-elements representing one pole respectively, and both the permanent magnets and the flux guide elements are attached to the shaft via a sleeve.

Another method of constructing a rotor having embedded magnets is shown in EP 0 872 944 A1. The magnets are arranged in a radial direction, or parallel to a radial direction, to the rotor. In EP 0 872 944, the permanent magnets are disposed in a so-called double-spoke configuration. Each of these "double magnets" consists of a pair of permanent magnets whose direction of magnetization is substantially the same. They can be arranged parallel to each other as in the cited publication or inclined at an angle to each other. This arrangement goes to improve the running performance of the electric motor and, in particular, to reduce cogging torque and torque ripple.

Other published patents in respect of rotors with embedded magnets include GB 1,177,247; EP 0 955 714 A2; and U.S. 2002/0067096 A1.

The rotor presented in the invention preferably finds application in a brushless DC motor or another permanent magnet synchronous motor. Such motors can be used in a great variety of applications, including spindle motors for disc drives, motor-assisted systems in motor vehicles such as steering and braking systems, electric tools and many other applications.

The radial arrangement of the permanent magnets embedded in the rotor core gives rise to the problem of stray flux in the region of the shaft onto which the rotor is mounted. The shaft is usually made from steel and acts as an extra back yoke for the magnetic flux through the rotor core. This gives rise to considerable magnetic stray. This problem can be countered by fitting a sleeve made from a magnetically non-conductive or low-conductive material to the shaft to which the flux guide elements of the rotor core are fixed, between which in turn the permanent magnets are embedded. This construction method is relatively costly and requires extra individual parts.

The object of the present invention is to submit a rotor for an electric motor which has embedded magnets and is simple to manufacture but nonetheless prevents the above problem of stray flux being generated in the region of the shaft.

SUMMARY OF THE INVENTION

This object has been achieved through a rotor having the characteristics described in claim 1. The rotor presented in the invention has an essentially cylindrical rotor core with a central aperture. Permanent magnets are embedded in the rotor core and extend essentially like spokes through the rotor core. According to the invention, the rotor core is formed from a basically integral body, with selected permanent magnets being bridged at their radially inner ends by recesses in the rotor core. As described above, for rotor cores of the prior art the problem arises that considerable stray flux is generated in the region of the shaft at the radially inner ends of the permanent magnets. The basic idea behind the invention is to interrupt the rotor core there where the risk of forming undesirable stray fields is the greatest. The recesses which bridge the radially inner ends of the permanent magnets prevent fields from propagating at will in this area. By these means, stray can be reduced considerably. Moreover, the magnetic field lines are guided more intensively to the outer region of the rotor which increases the effectiveness of the electric motor.

In a preferred embodiment of the invention, the radially inner ends of two adjacent permanent magnets are bridged by a recess. Two like poles of the adjacent permanent magnets are preferably bridged in this way.

In another beneficial embodiment of the invention, the permanent magnets are arranged in the rotor core in pairs like double spokes, the permanent magnets of each pair being magnetized in the same direction. According to the invention, it is the directly adjacent permanent magnets of two adjacent permanent magnet pairs that are bridged at their radially inner ends.

It generally holds true that, depending on the special configuration of the permanent magnets embedded in the rotor core, the recesses are suitably selected and arranged so that the magnetic flux at the outer periphery of the rotor is intensified and undesirable stray flux in the region of the central aperture of the rotor core is prevented.

For the efficient functioning of the rotor presented in the invention, it is important that the rotor core is formed from an integral body so that the permanent magnets are fully enclosed by the rotor core at least at their radially inner ends or radially outer ends.

In a suitable and preferred embodiment of the invention, the recesses are bounded by bridges at the central aperture of the rotor core and also by the inner ends of two adjacent magnets. These bridges form a closed ring around the central aperture and bridge the radially inner ends of two adjacent permanent magnets.

By these means, the rotor core forms a closed surface at its central aperture which can be fitted onto the shaft. This means that the rotor presented in the invention can be directly fitted onto the steel shaft without the need to interpose a sleeve and without the risk of the shaft generating a magnetic reflux and significant stray flux being incurred. These are prevented by the described recesses which are enclosed by the bridges.

The invention thus reveals a rotor for an electric motor which is easily constructed and preferably has a closed surface at it central aperture so that it can be directly mounted onto a shaft. The construction presented in the invention minimizes the stray flux between the rotor and the shaft without needing to provide an extra sleeve made of a non-magnetic or low-magnetic material.

According to the invention, the bridges are preferably formed in such a way that they bridge the radially inner ends of two adjacent permanent magnets. By these means, two adjacent, like poles can be connected by a bridge. The technician will be aware that these could be either the N or the S poles.

The recess can be filled with air or any other gaseous medium. Alternatively, the recess can also be filled with another non-magnetic or low-magnetic material.

In a preferred embodiment of the invention, the permanent magnets are also fully enclosed by the rotor core at their radially outer ends. This produces a rotor with fully embedded rotor magnets allowing the rotor to come into contact with aggressive media as well without causing problems. A large variety of magnetic materials can be used and, in particular, those materials that would require extra surface protection if the magnets were exposed.

The rotor core consists of a ferromagnetic material, preferably of sheet metal laminations which are stacked to prevent eddy currents. As an alternative, ferrite materials can be used. The rotor core can be constructed in such a way that it has slots into which the permanent magnets can be inserted from either side. The rotor core is then sealed from both sides so that the magnets are hermetically sealed and do not require a surface coating. As magnetic materials, neodymium-iron-boron (NbFeB) or samarium-cobalt (SmCo) magnets can be used, for example. To prevent corrosion of these materials they would normally have to be coated. By embedding them fully into the rotor core, however, this is no longer necessary. Moreover, fully embedding the permanent magnets into the rotor core provides the permanent magnets with extra mechanical protection.

The invention can also be applied to an outer rotor motor. In this configuration, the recesses which bridge two adjacent permanent magnets are provided in the vicinity of the outer periphery of the rotor core.

SHORT DESCRIPTION OF THE DRAWINGS

Figure 2:
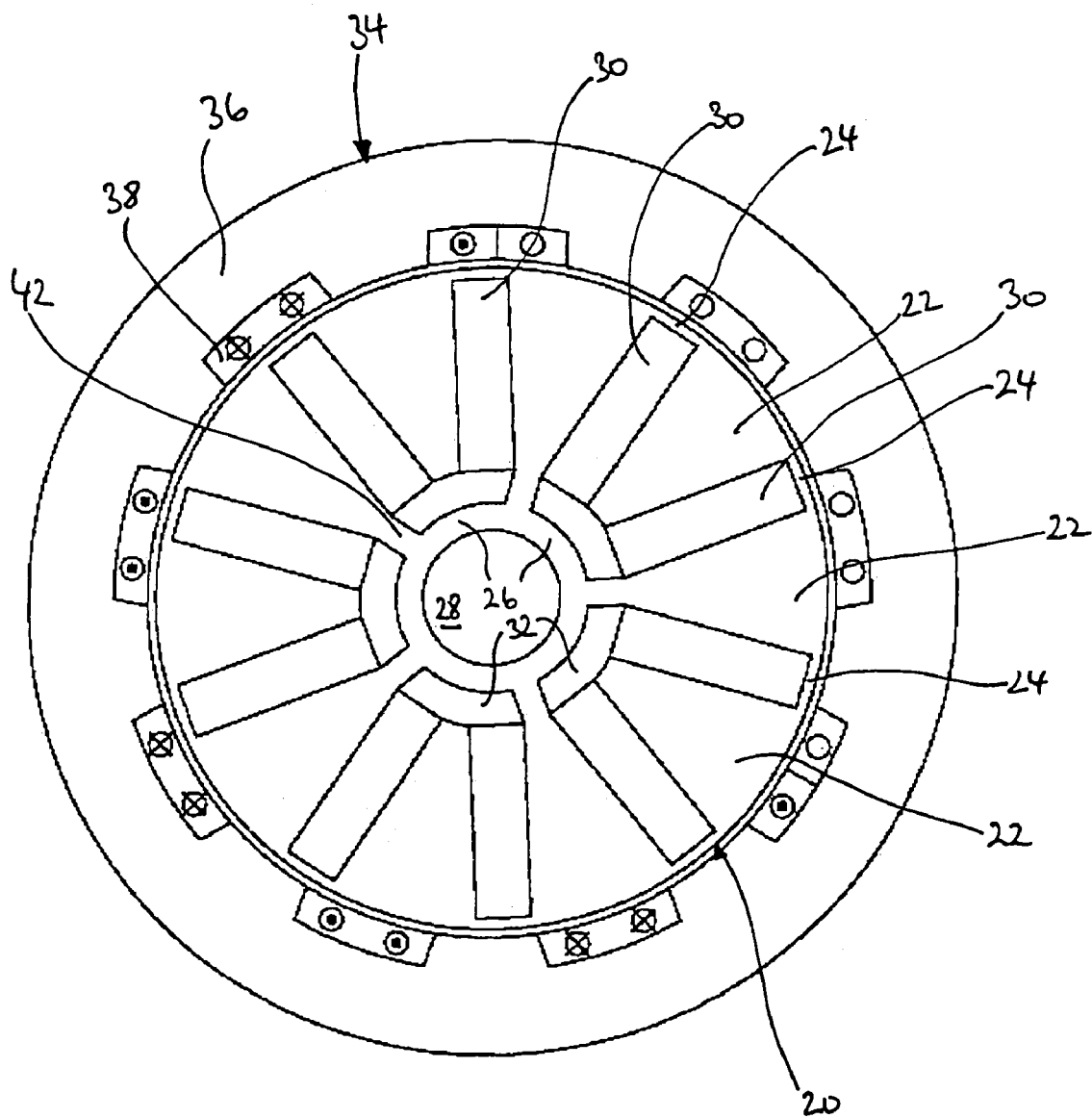
Figure 3:
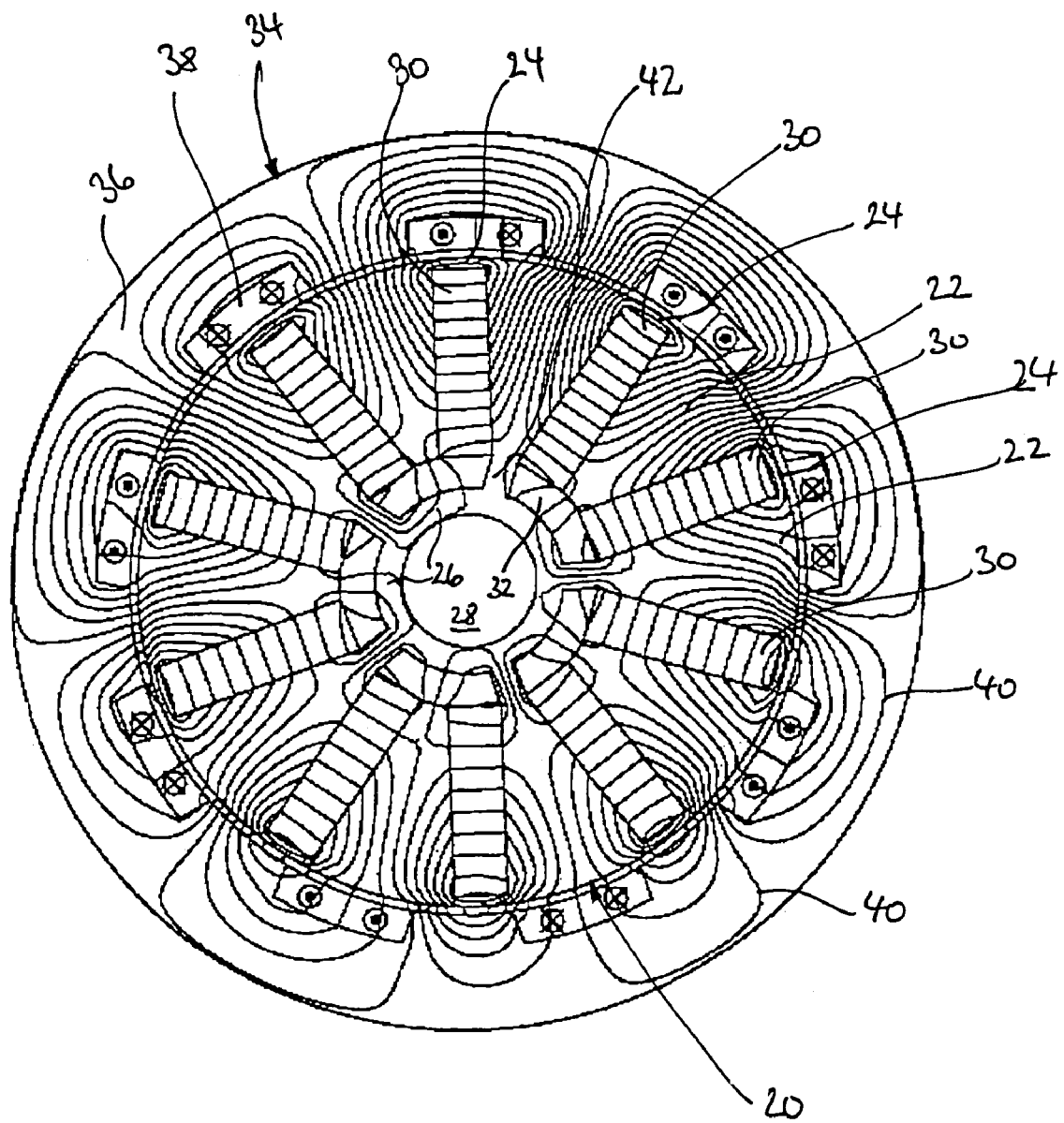
Figure 4:
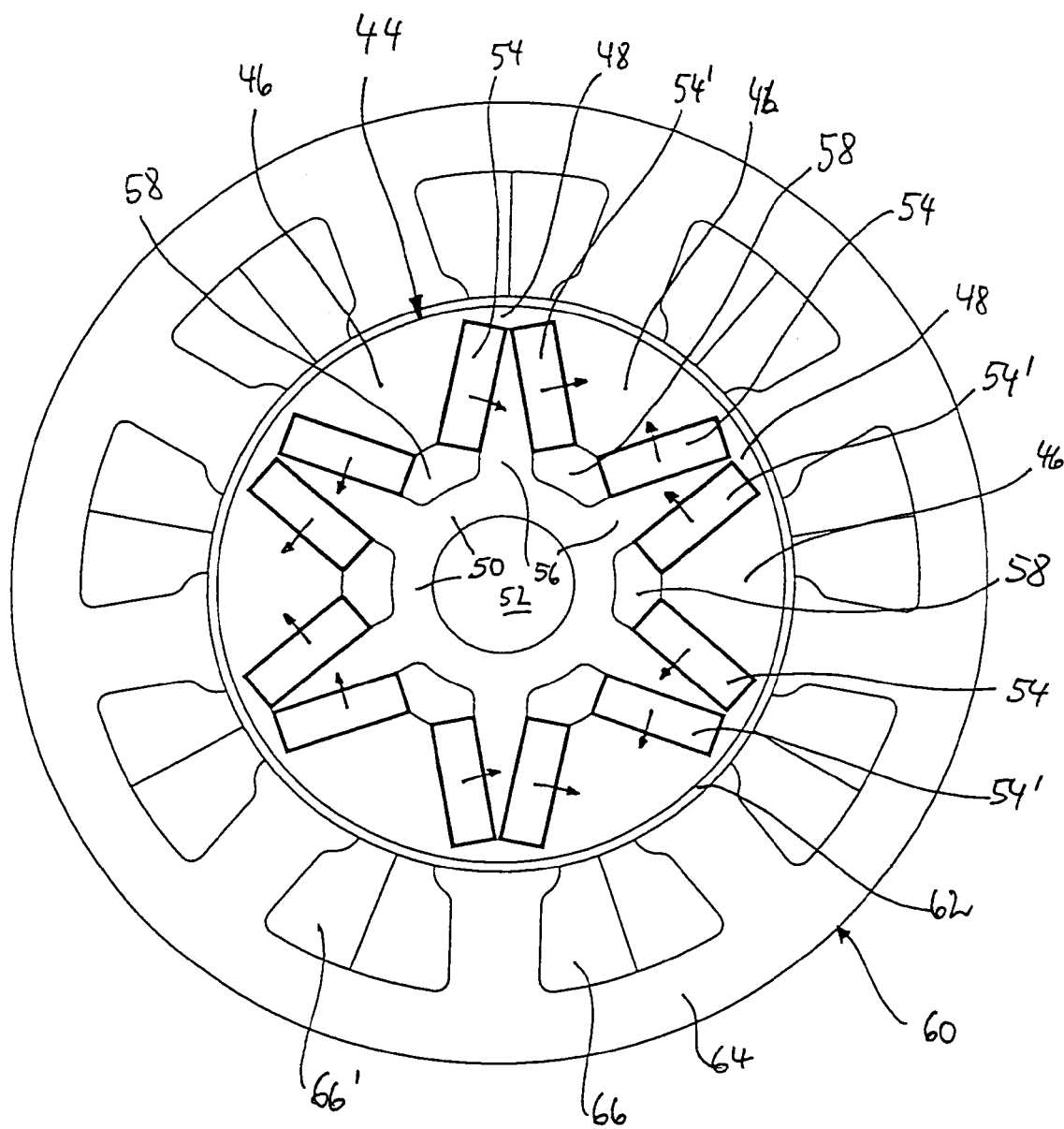
Figure 5:
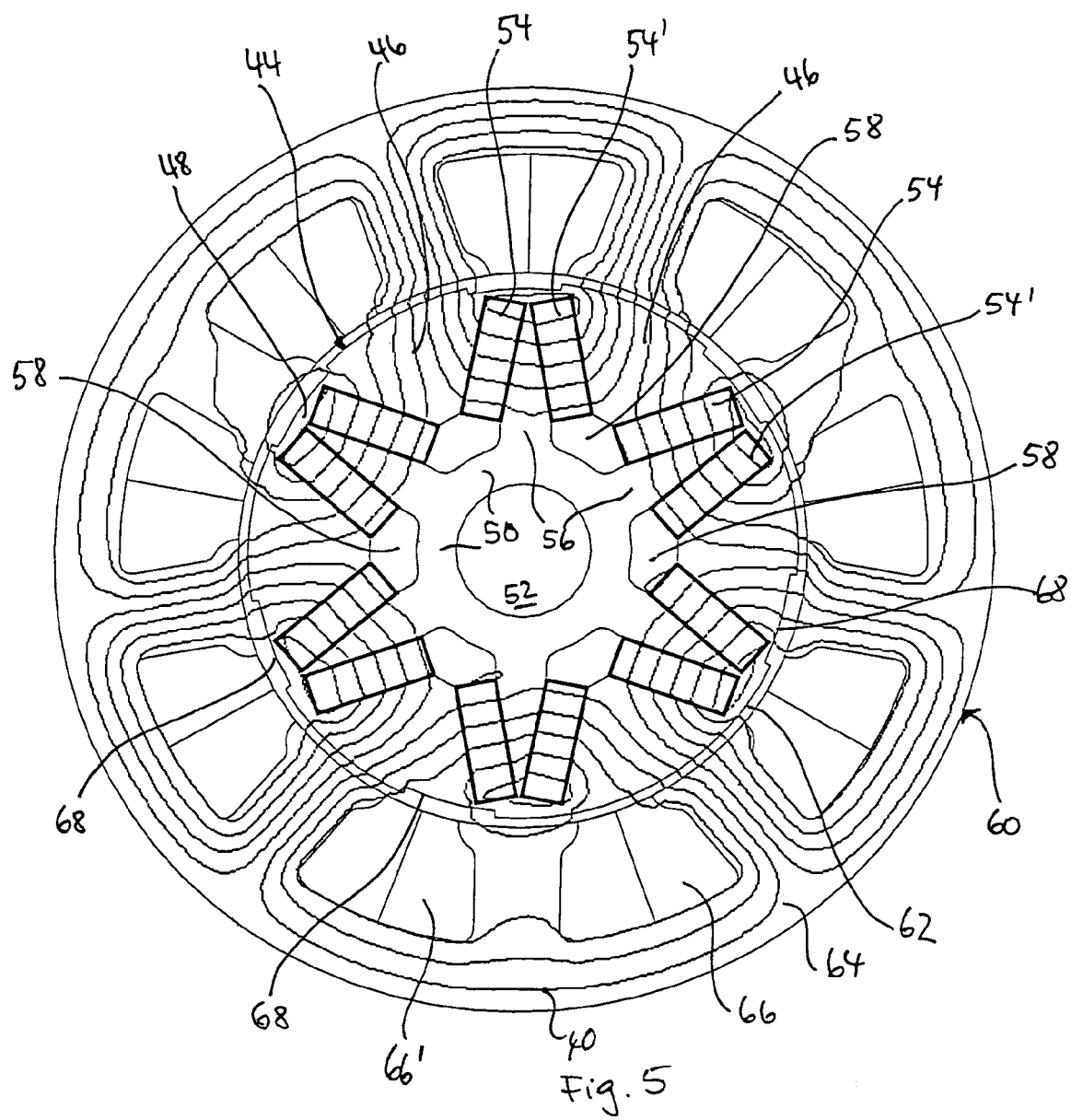
Figure 6:
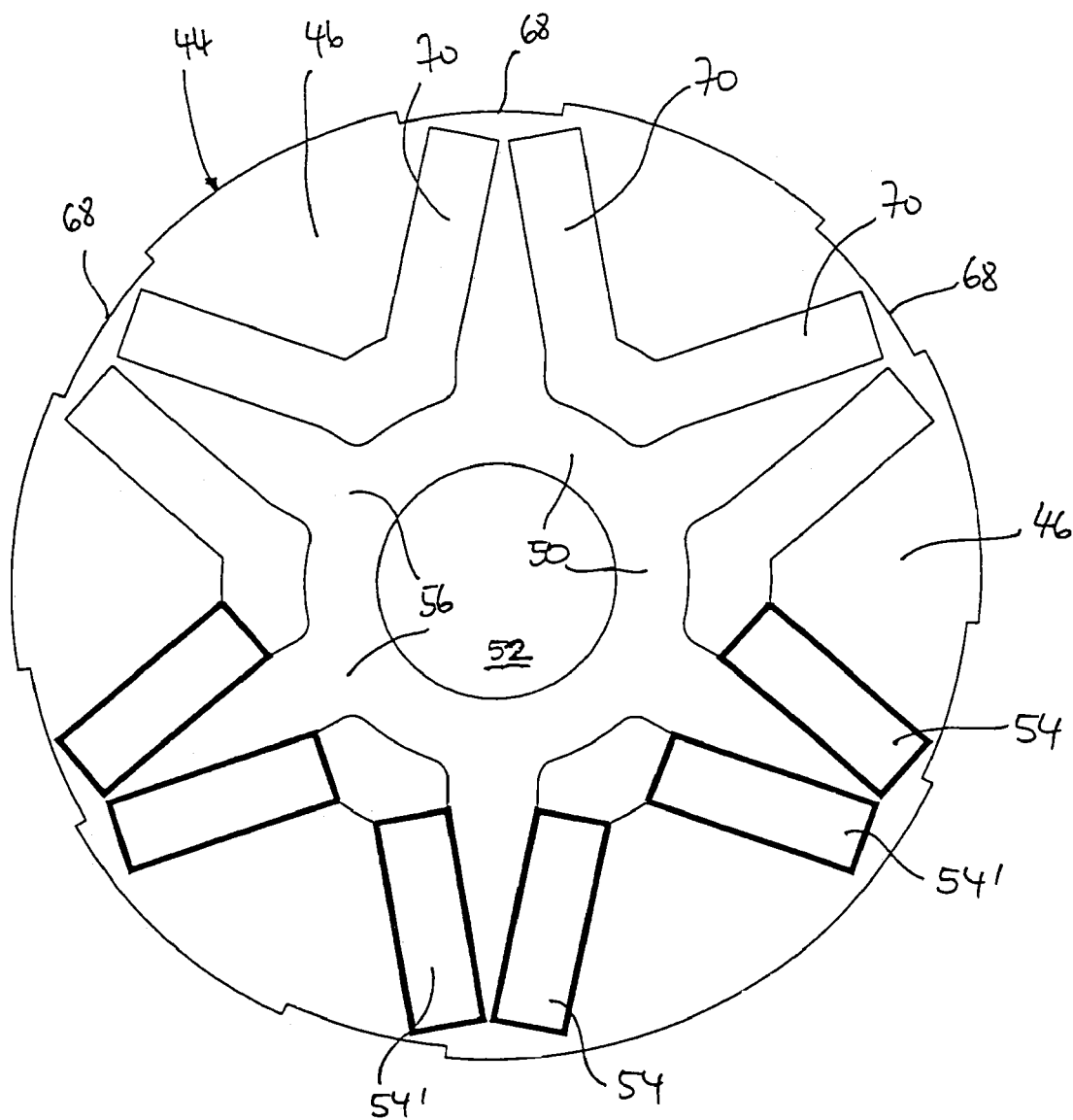
Figure 7:
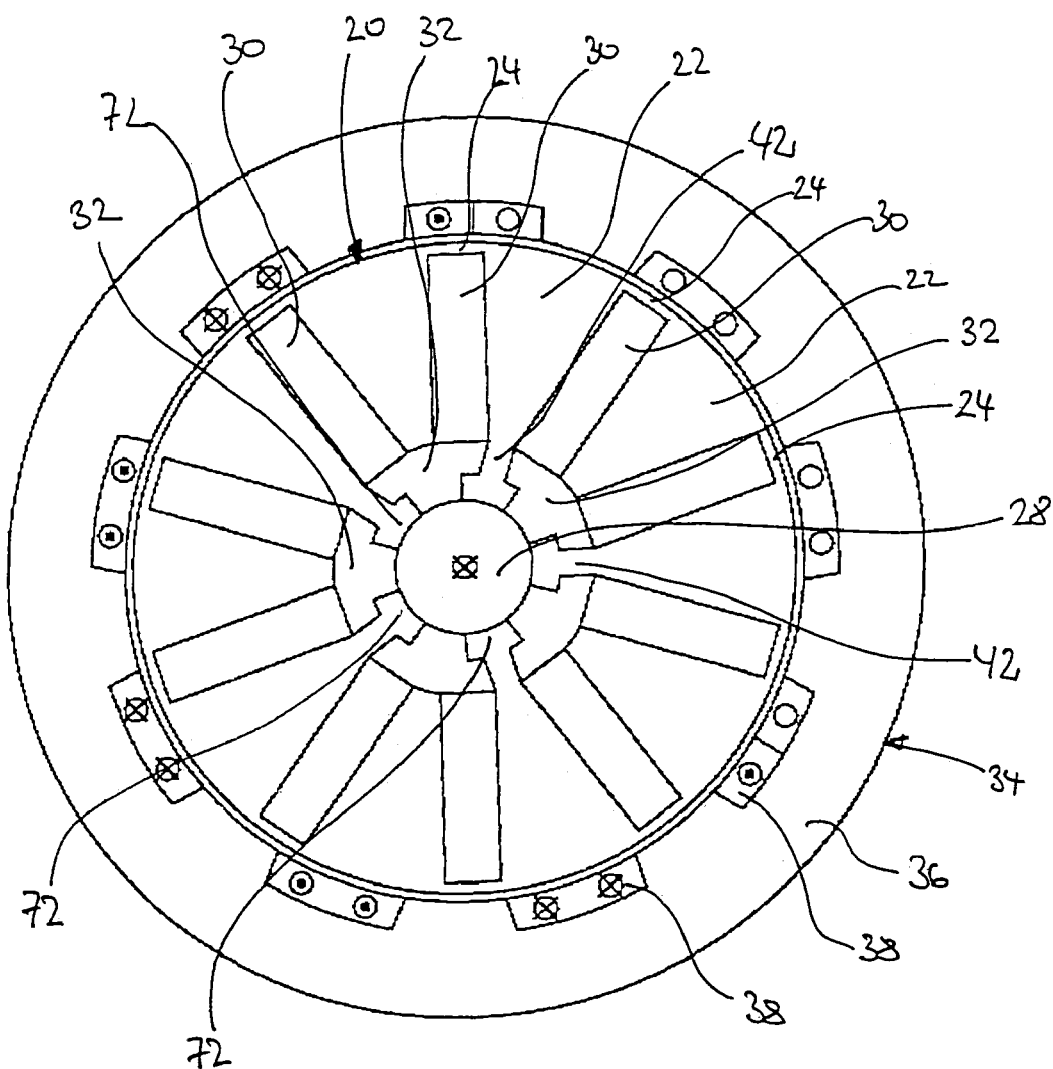

The invention is described in more detail below on the basis of preferred embodiments with reference to the drawings. The figures show:

FIG. 1 a schematic sectional view through a rotor which is ideal in respect of the magnetic circuit;

FIG. 2 a schematic sectional view through a rotor in accordance with the invention with the stator enclosing the rotor also being shown;

FIG. 3 a similar view as in FIG. 2 with flux lines being marked in;

FIG. 4 a schematic sectional view through a rotor in accordance with another embodiment of the invention which is fitted into a stator;

FIG. 5 a similar view as in FIG. 4 with flux lines being marked in;

FIG. 6 a schematic sectional view through a rotor in accordance with another embodiment of the invention;

FIG. 7 a schematic sectional view through a rotor in accordance with another embodiment of the invention which is fitted into a stator;

FIG. 8 a sectional view through an electric motor in accordance with the prior art.

DETAILED DESCRIPTION OF PREFERRED EMBODIMENTS

FIG. 1 shows a schematic sectional view through a rotor which is ideally constructed in respect of the magnetic circuit. The rotor 10 is fitted onto a shaft 12 which is usually made of steel. For this purpose, a sleeve 14 is pressed or bonded onto the shaft 12 and flux guide elements 16 are fixed to the sleeve 14, between which permanent magnets 18 are embedded. The sleeve 14 has the function of preventing magnetic stray flux between the flux guide elements 16 and the shaft 12. For this purpose, it is made of a magnetically non-conductive or low-conductive material. With the aid of the sleeve 14, it is possible to ensure that practically no magnetic losses are incurred in the region of the shaft 12. This construction of the rotor 10 as illustrated in FIG. 1 is thus ideal in terms of the magnetic circuit. It is disadvantageous, however, in that it requires many individual parts, making the mechanical construction both complicated and costly.

FIG. 2 shows a schematic sectional view through a rotor in accordance with the invention. The rotor 20 of the invention includes flux guide elements 22 which are joined together via outer and inner bridges 24, 26 at the outer periphery or at a central aperture 28 of the rotor 20 respectively. In the illustrated embodiment, the inner bridges 26 form a closed ring and thus enclose the central aperture 28. Permanent magnets 30 are embedded between the flux guide elements 22 and extend like spokes in a radial direction through the rotor 20.

The outer bridges 24 have the function of fully embedding and protecting the permanent magnets 30 in the rotor 20 from the outside so that the permanent magnets 30 cannot come into contact with the medium surrounding the rotor 20. The inner bridges 26 have a similar function. The inner bridges 26 ensure that the rotor 20 is fixedly connected to the shaft 12. The bridges 24, 26 connect the flux guide elements 22 so that the rotor 20 forms a single integral body. For the optimal functioning of the rotor 20 of the invention, at least the outer bridges 24 or the inner bridges 26 should connect each of the flux guide elements 22 to each other to form a magnetic connection between the like poles of the rotor 20.

In the preferred embodiment of the invention illustrated in FIG. 2, the inner bridges 26 form a closed ring enabling the rotor 20 to be directly fitted, e.g. pressed or bonded, onto the shaft (not illustrated) without the need to interpose a sleeve.

The inner bridges 26 are connected to the flux guide elements 22 via short radial bridges 42 and each enclose a recess 32. In the embodiment illustrated in FIG. 2, each recess 32 bridges two adjacent permanent magnets 30, with the inner bridges 26 in this embodiment connecting like poles of the permanent magnets 30. In the embodiment illustrated in FIG. 2, the bridges 26 connect the S poles. It is clear that the inner bridges could also connect only the N poles. This produces a rotor 20 design in which the bridges 26 bridge the radially inner ends of two permanent magnets 30 and thus enclose the recess 32 which can be filled with air or another magnetically non-conductive or low-conductive medium. In principle, bridges can connect all like poles, although an integral tube is formed when only two like poles are joined via the ring 26.

Due to the design of the rotor 20 presented in the invention and in particular due to the specific design and arrangement of the recesses 32, stray flux in the interior of the rotor 20, that is to say near the inner bridges 26 and the central aperture 28, can be largely prevented. This results in a considerably lower magnetic loss than in the case of conventional rotors with embedded magnets which are constructed without the sleeve 14 shown in FIG. 1.

The flux guide elements 22 are made of ferromagnetic material and are preferably formed from sheet metal laminations which are stacked to prevent eddy currents. As an alternative, they can be made from ferrite material. The flux guide elements 22 of the rotor 20 can be built as an integral component into which the magnets 30 are inserted from either side. The rotor 20 is then sealed so that the magnets are hermetically sealed and do not require a surface coating.

The rotor 20 is enclosed by a stator 34 which includes a stator core 36 and stator windings 38. The stator core 36 can again consist of sheet metal laminations which are stacked as generally known in the prior art.

All permanently magnetic materials can be used as magnet materials. Examples include neodymium-iron-boron (NbFeB) and samarium-cobalt (SmCo).

FIG. 3 shows a schematic sectional view through the rotor according to the invention which is set into a stator. In FIG. 3, flux lines 40 have been marked in to explain the invention. Like components appearing in FIG. 2 are indicated by the same reference numbers and are not described in detail again.

In FIG. 3, magnetic flux lines 40 are marked in, with the strength of the magnetic field being greater where the flux lines are more densely spaced so that it can be seen from the figure that the magnetic flux is very low in the region of the recesses 32. This means that no stray flux between the rotor 20 and the shaft, on which it is placed, is incurred during operation.

FIG. 3 makes it clear that in the design of the rotor 20 presented in the invention in which the recesses 32 bridge like poles of adjacent permanent magnets 30, practically no stray flux towards the shaft, in the region of the central aperture 28, is incurred without the need to provide a special sleeve between the rotor and the shaft. In this way, losses can be kept low.

FIG. 4 shows a schematic sectional view through another embodiment of the rotor according to the invention, with the rotor being set into a stator. The rotor 44 includes flux guide elements 46 which are connected via outer and inner bridges 48 or 50 at the outer periphery or at a central aperture 52 in the rotor 44 respectively in order to form an integral body. In the illustrated embodiment, the inner bridges 50 form a closed ring and enclose the central aperture 52. Permanent magnets 54, 54' are embedded between the flux guide elements 46 and extend through the rotor 44 in an essentially radial direction like double spokes. Two directly adjacent permanent magnets 54, 54' form a permanent magnet pair, the permanent magnets 54, 54' of a pair being inclined at an angle to each other relative to the radius of the rotor 44. In another embodiment which is not illustrated, the permanent magnets of a pair can also be arranged parallel to each other. The permanent magnets 54, 54' of a pair have essentially the same direction of magnetization, i.e. the arrangement of the north and south poles as indicated by the arrows in FIG. 4. This means that between the permanent magnets 54, 54' of a pair, no poles are formed but rather the magnetic field lines connect the inner sides of the permanent magnets of a pair at the shortest distance, as can be seen from FIG. 5. The permanent magnets 54, 54' of a pair essentially act as a double magnet enabling the field generated by the magnets to be intensified compared to the embodiment shown in FIG. 2. The arrangement of the permanent magnets at an angle goes to improve torque and particularly to suppress cogging torque.

The function of the bridges 48, 50 in protecting the embedded permanent magnets 54, 54' and in enabling the rotor 44 to be directly mounted onto a shaft is essentially the same as described in relation to FIG. 2. Moreover, the bridges 50 in combination with shorter radial bridges 56 enclose recesses 58 which bridge adjacent permanent magnets 54, 54' of adjacent permanent magnet pairs. In the illustrated embodiment, the inner bridges 50 connect the spaces between the permanent magnets 54, 54' of a permanent magnet pair. The effect of the recesses 58 thus formed is the same as described in reference to FIGS. 2 and 3 and as explained below in reference to FIG. 5.

In the embodiment illustrated in FIG. 4, the flux guide elements 46 are also made of ferromagnetic material and are preferably formed from sheet metal laminations which are stacked to prevent eddy currents. The flux guide elements 46 of the rotor 44 are preferably made as an integral component.

The rotor 44 shown in FIG. 4 is enclosed by a stator 60 with an air gap 62 being formed between the stator 60 and the rotor 44. The stator 60 includes a stator core 64 with associated stator poles onto which phase windings 66, 66' are wound. For its part, the stator core 64 can be made of sheet metal laminations which are stacked as is basically known in the prior art.

FIG. 5 shows a similar schematic sectional view through the rotor 44 of the invention which is placed into a stator 60, with like components being identified by the same reference numbers as in FIG. 4. In FIG. 5, flux lines have been marked in to explain the invention.

In modification of the embodiment shown in FIG. 4, recesses 68 are provided in FIG. 5 at the outer periphery of the rotor 44 in the region of the outer bridges 48, which are evenly or unevenly distributed over the periphery of the rotor 44. These recesses 68 improve the torque of the electric motor in operation and, in particular, reduce cogging torque even more than in the embodiments described above.

In FIG. 5, magnetic flux lines 40 are marked in and it can be seen from the figure that the magnetic flux is practically non-existent in the region of the recesses 58 so that no magnetic stray flux between the rotor 44 and the shaft, onto which it is mounted, is incurred during operation.

FIG. 6 shows a schematic sectional view through the embodiment of the rotor 44 illustrated in FIG. 5. Like components appearing in FIG. 5 are identified by the same reference numbers and are not described again. It can be seen from FIG. 6 that the rotor of the invention can be so constructed that slots 70 to accommodate the permanent magnets 54, 54' can be formed in the rotor 44, the permanent magnets being inserted into these slots 70 and the rotor 44 being then sealed.

Another embodiment of the rotor presented in the invention is shown schematically in FIG. 7. This embodiment substantially corresponds to the embodiment described in reference to FIG. 2, with the radially inner bridges, however, not forming a closed ring. Like components appearing in FIG. 2 are identified by the same reference numbers as in FIG. 2 or FIG. 3.

In the embodiment illustrated in FIG. 7, the recesses 32 are enclosed by the short radial bridges 42 as well as by bridge butts 72, which adjoin the central inner aperture 28 of the rotor 20. The outer bridges 24 ensure an integral rotor body 20 with all the flux guide elements 22 being connected. Although the radially inner bridges or bridge butts 72 are not connected to each other, the recesses 32 provide the same suppression of stray flux between rotor 20 and shaft as described above in reference to the previous embodiments. Only the mechanical strength of the rotor 20 at the central inner aperture 28 is somewhat less than in the embodiments described above.

The characteristics revealed in the above description, the claims and the figures can be important for the realization of the invention in its various embodiments both individually and in any combination whatsoever.

IDENTIFICATION REFERENCE LIST

10 Rotor
12 Shaft
14 Sleeve
16 Flux guide elements
18 Permanent magnets
20 Rotor
22 Flux guide elements, rotor core
24,26 Bridges
28 Central aperture
30 Permanent magnets
32 Recess
34 Stator
36 Stator core
38 Stator windings
40 Flux lines
42 Radial bridges
44 Rotor
46 Flux guide elements, rotor core
48, 50 Bridges
52 Central aperture
54, 54' Permanent magnets
56 Radial bridges
58 Recesses
60 Stator
62 Air gap
64 Stator core
66, 66' Phase windings
68 Recesses
70 Slots
72 Bridge butts
110 Shaft
112 Back iron yoke
114 Housing
116 Rotor arrangement
118 Stator arrangement
122 Permanent magnets
124 Flange
126, 128 Bearings
155 Metal laminations
160 Windings

What is claimed is:

1. A rotor for an electric motor comprising
   a cylindrical rotor core having a central aperture with a plurality of permanent magnets embedded in the rotor core, the permanent magnets extending radially about the central aperture aperture and having an inner end and an outer end, wherein adjacent permanent magnets are grouped in pairs,
   an inner recess adjacent the central aperature adjoining the inner ends of each pair of the permanent magnets;
   a plurality of bridge butts adjacent the central aperture interposed between adjacent inner recesses, wherein each of said inner recesses adjoins two bridge butts; and a radial bridge radially adjacent to each bridge butt interposed between adjacent inner recesses adjoining two permanent magnets from different pairs of permanent magnets.

2. A rotor according to claim 1, wherein the two permanent magnets of a pair are magnetized in the same magnetic direction.

3. A rotor according to claim 1, wherein the permanent magnets are enclosed by the rotor core at an outer end.

4. A rotor according to claim 1, wherein the recesses are filled with air or a non-magnetic medium.

5. A rotor according to claim 1, wherein the rotor core further comprises a ferromagnetic material.

6. A rotor according to claim 1, wherein the rotor core further comprises sheet metal laminations.

7. A rotor according to claim 1, wherein the rotor core further comprises a plurality of slots for receiving permanent magnets.

8. A rotor for an electric motor comprising:
   a rotor core having a central aperture and a plurality of permanent magnets embedded in the rotor core, the permanent magnets extending radially about the rotor core and having an inner end and an outer end, wherein adjacent permanent magnets are grouped in pairs;
   the rotor core defining an integral body,
   the rotor core defining a plurality of inner recesses to influence the magnetic field of the permanent magnets, wherein each inner recess adjoins the inner ends of a pair of permenat magnets and is enclosed by a pair of radial bridges and a pair of bridge butts, the pair of bridge butts located adjacent the central aperture interposed between adjacent inner recesses, wherein each radial bridge is located radially adjacent a bridge butt and adjoins two permanent magnets from different pairs of permanent magnets.

9. An electric motor comprising a stator and a rotor; the rotor having:
   a core with a central aperture and a plurality of permanent magnets embedded in the rotor core and extending radially about the central aperture through the rotor core, at least two permanent magnets being bridged at a radially inner end by an inner recess in the rotor core, the rotor core being coupled to a shaft and enclosed by the stator;
   at least two permanent magnets bridged at a radially outer end by an outer bridge; and
   an outer recess located on a circumferential surface of the rotor proximate the outer bridge; and said inner recess adjoins a pair of bridge butts that are adjacent the central aperture.

* * * * *